（12）United States Patent
Maas et al.

(10) Patent No.: US 9,813,903 B2
(45) Date of Patent: Nov. 7, 2017

(54) METHOD FOR COMMUNICATING IN A NETWORK, A COMMUNICATION DEVICE AND A SYSTEM THEREFOR

(75) Inventors: Martijn Maas, Eindhoven (NL); Oscar Garcia Morchon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 350 days.

(21) Appl. No.: 13/063,216

(22) PCT Filed: Sep. 8, 2009

(86) PCT No.: PCT/IB2009/053918
§ 371 (c)(1),
(2), (4) Date: Mar. 10, 2011

(87) PCT Pub. No.: WO2010/032158
PCT Pub. Date: Mar. 25, 2010

(65) Prior Publication Data
US 2011/0164750 A1 Jul. 7, 2011

(30) Foreign Application Priority Data
Sep. 17, 2008 (EP) .................... 08305561

(51) Int. Cl.
*H04K 1/00* (2006.01)
*H04W 12/04* (2009.01)
(Continued)

(52) U.S. Cl.
CPC .......... *H04W 12/04* (2013.01); *H04L 63/061* (2013.01); *H04L 63/0435* (2013.01); *H04W 84/18* (2013.01)

(58) Field of Classification Search
CPC ..... H04L 9/0825; H04L 9/0833; H04L 9/085; H04L 2209/805; H04L 2209/085
See application file for complete search history.

(56) References Cited

U.S. PATENT DOCUMENTS 6,047,190 A * 4/2000 Haleem ................ H04W 16/10
455/449
6,055,432 A * 4/2000 Haleem ................ H04W 16/10
455/449
(Continued)

OTHER PUBLICATIONS

Seyit A. Camtepe, "Combinatorial Design of Key Distribution Mechanisms for Wireless Sensor Networks", IEEE/ACM Transactions on Networking, vol. 15, No. 2, Apr. 2007, pp. 346-358.
(Continued)

*Primary Examiner* — Saleh Najjar
*Assistant Examiner* — Devin Almeida

(57) ABSTRACT

The present invention relates to a communication system comprising a first node and second node adapted for communicating in a network, wherein the first node comprises a first list of keying materials including a plurality of keying materials, wherein the second node comprises a second list of keying materials including a plurality of keying materials, wherein the first node further comprises a receiver for receiving from the second node a second node identifier, a controller being arranged for determining from the second node identifier the position in the first list of at least one keying material having a common root with one keying material of the second list, and for generating an encryption key by means of the keying material having a common root and the second node identifier.

15 Claims, 1 Drawing Sheet

(51) Int. Cl.
    *H04L 29/06*           (2006.01)
    *H04W 84/18*          (2009.01)

(56) References Cited

U.S. PATENT DOCUMENTS

| | | | |
|---|---|---|---|
| 6,240,188 B1 * | 5/2001 | Dondeti | H04L 9/0891 |
| | | | 380/259 |
| 6,918,038 B1 | 7/2005 | Smith | |
| 7,234,063 B1 * | 6/2007 | Baugher | H04L 9/0833 |
| | | | 380/259 |
| 2005/0097317 A1 * | 5/2005 | Trostle | H04L 9/0833 |
| | | | 713/163 |
| 2005/0135305 A1 * | 6/2005 | Wentink | H04B 7/2126 |
| | | | 370/329 |
| 2006/0083377 A1 * | 4/2006 | Ptasinski | H04L 63/062 |
| | | | 380/270 |
| 2007/0156858 A1 | 7/2007 | Sood | |
| 2008/0016550 A1 * | 1/2008 | McAlister | H04L 63/105 |
| | | | 726/1 |
| 2009/0129599 A1 * | 5/2009 | Garcia | H04L 9/083 |
| | | | 380/279 |
| 2009/0167535 A1 * | 7/2009 | Sanchez et al. | 340/573.1 |

OTHER PUBLICATIONS

David S. Sanchez et al, "A Deterministic Pairwise Key Pre-Distribution Scheme for Mobile Sensor Networks", Proceedings of the First International Conference on Securitiy and Privacy for Emerging Areas in Communications Networks (Securecomm), Sep. 5, 2005, pp. 277-288.

* cited by examiner

METHOD FOR COMMUNICATING IN A NETWORK, A COMMUNICATION DEVICE AND A SYSTEM THEREFOR

FIELD OF THE INVENTION

The present invention relates to a method for communicating in a network comprising a plurality of communication devices, to such devices, and to a system comprising a plurality of such devices. More specifically, the invention relates to a system of communication using encryption materials distributed to communication devices of the network so that they can communicate in a secure manner.

This invention is, for example, relevant for sensor networks, like wireless sensor and actuator networks (WSNs), where the sensor nodes are low-power, low-cost devices.

BACKGROUND OF THE INVENTION

Sensor networks, for instance mobile wireless sensor and actuator networks (WSNs) are used in a wide range of applications. The size of such networks can vary from tens to several tens of thousands of nodes. Their nature can be very dynamic, i.e. the network topology may change over the time. The sensor nodes have to be very cost-efficient, so they typically have very limited resources like battery power, communication bandwidth, processing power, memory, and likewise.

Security services like confidentiality, authentication, integrity, and authorization are essential to applications like medical applications and ZigBee as required by applications such as patient monitoring or wireless control networks. However, due to the resource-constrained nature of the nodes, security methods based on asymmetric cryptography are generally considered inefficient or infeasible. Therefore, symmetric cryptography is usually applied to enable the required security services. The fundamental problem with symmetric cryptography, however, is key-distribution: how to establish shared secrets in nodes that need to communicate securely. This problem is particularly eminent in WSNs, because of their dynamic nature and possibly large size.

Thus, key pre-distribution methods have been proposed, wherein each of the sensor nodes is provided with a set of cryptographic elements prior to deployment. Once the nodes are deployed, the cryptographic elements enable them to establish common secrets on which to base the security services. Two trivial key pre-distribution methods are loading the same symmetric key in all nodes offering an optimal scalability, but minimal resilience, and providing a different key for every possible pair of nodes offering an optimal resilience, but minimal scalability.

As a consequence, it is proposed to use a method being a tradeoff of these two methods. However, when one node wishes to communicate with a further node, it needs to discover which encryption element is common to both nodes, by computing the composition of the further node set of elements and comparing this further set with its own set of elements. Depending on the number of different encryption elements in the set of encryption elements, and on the method for distributing the encryption elements to each node, this step of discovering the common encryption element may require a high computation power and a high memory capacity. As a consequence, this method is not adapted to sensor networks where nodes have a low capacity.

SUMMARY OF THE INVENTION

It is an object of the invention to propose a method for communicating in a network enabling secure communications, especially in a sensor network.

It is another object of the present invention to propose a method for communicating in any kind of networks comprising secure communications allowing discovering a common encryption element in an efficient manner.

To this end, the in accordance with the invention is characterized in that method for communicating in a network between a first node and a second node,
wherein the first node comprises a first list of cryptographic elements including a plurality of cryptographic elements,
wherein the second node comprises a second list of cryptographic elements including a plurality of cryptographic elements, said method comprising:
a) the first node receiving from the second node a second node identifier,
b) the first node determining from the second node identifier the position in the first list of at least one cryptographic element based on a common root with one cryptographic element of the second list,
c) the first node generating an encryption key by means of the cryptographic element having a common root and the second node identifier.

As a consequence, the first node does not need to build the complete set of encryption elements of the further node, and may deduce from the identifier of the further node which elements are based on a common root. For instance, if the cryptographic elements are encryption keys, two keys based on a common root are equal. If the cryptographic elements are keying materials, i.e. key generator functions, they are based on a common root if these functions are determined from a single common key share. For instance, the common key root may be a bivariant symmetric polynomial.

In accordance with a second aspect of the invention, it is proposed a communication node adapted for communicating in a network with at least a further communication node,
wherein the communication node comprises a first list of keying materials including a plurality of keying materials, a receiver for receiving from the further node a node identifier, a controller adapted for determining from the further node identifier the position in the first list of at least one keying material having a common root with one keying material of a further list of keying materials corresponding to the further node, and for generating an encryption key by means of the keying material having a common root and the further node identifier.

In accordance with a third aspect of the invention, it is proposed a communication system comprising a first node and second node adapted for communicating in a network,
wherein the first node comprises a first list of keying materials including a plurality of keying materials,
wherein the second node comprises a second list of keying materials including a plurality of keying materials,
wherein the first node further comprises a receiver for receiving from the second node a second node identifier, a controller being arranged for determining from the second node identifier the position in the first list of at least one keying material having a common root with one keying material of the second list, and for generating an encryption key by means of the keying material having a common root and the second node identifier.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for secure communications from a first node to a second node in a network. The present invention is more especially dedicated to wireless sensor and actuator networks for example used for patient monitoring, e.g. networks comprising sensor nodes for sensing physical parameters of a patient, receptor nodes for providing medical staff with the parameters, and actuator nodes.

However, it is to be noted that the present invention is not limited to networks of the like, and can be carried out in any type of network, used for any technical application.

Figure 1:
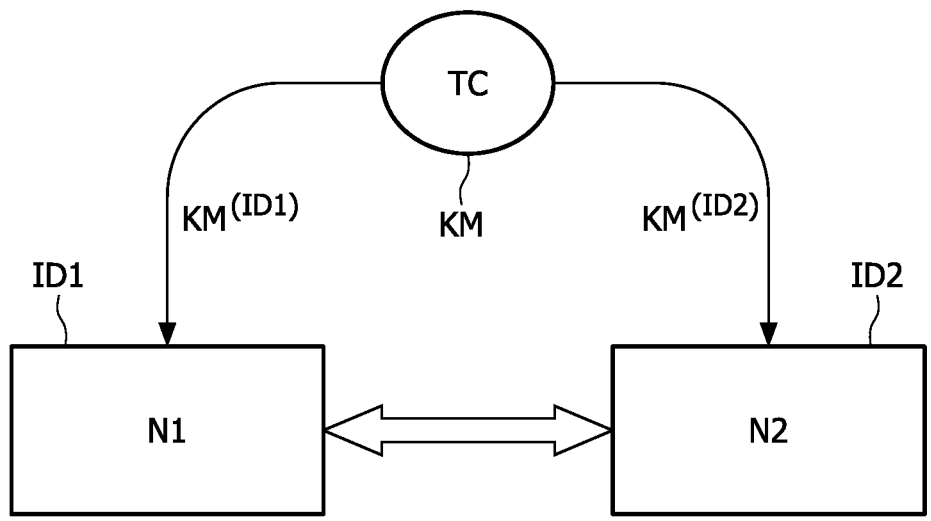
FIG. 1 is a network according to one embodiment of the invention
Figure 2:
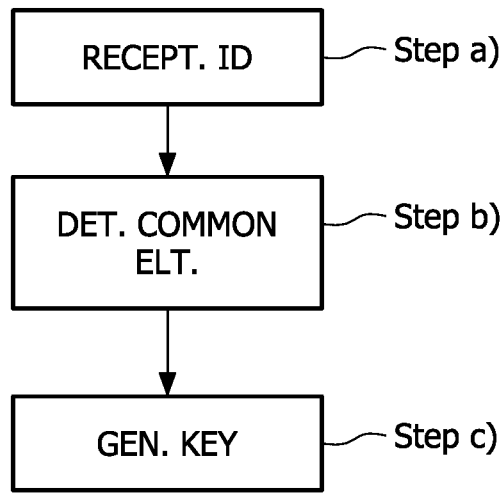
FIG. 2 is a block diagram of a method for secure communications from a first node to a second node, according to an embodiment of the invention.

A method according to one embodiment of the invention will now be described in connection with FIGS. 1 and 2.

A network according to the invention comprises at least two nodes N1 and N2, each one being provided with an identifier, respectively called ID1 and ID2. In an embodiment, the network also comprises a trust center node TC, used for the configuration of the network and for providing the nodes N1 and N2 with all necessary information for generating cryptographic keys.

During operational phase, to ensure the communication between the first node N1 and the second node N2 of the network, each of the nodes generates a shared key and uses this key to encode any communication sent to the other node, or to decode any communication received from this other node. FIG. 2 describes the different steps required for the first node to generate a shared key for communicating with the second node. Similar steps may be performed by the second node for generating the corresponding shared key for communicating with the first node.

In accordance with this example, to generate a key, two nodes need to be provided with keying material shares, respectively $KM^{(ID1)}$ and $KM^{(ID2)}$ i.e. some information allowing for key establishment. Each keying material share is generally received from the trust center TC during a configuration phase or distribution phase of the network. The keying material shares provided to the nodes are generated from a root keying material KM, which is a crypto information only known to the trust center. In this example the root keying material is a bivariant function, like a polynomial, and each keying material share is a monovariant function. Advantageously, the root keying material is a symmetric bivariant function. It is to be noted that in other examples of the invention, the keying material shares are multivariate functions or encryption keys of a symmetric encryption system.

The method described above is thus not intended to be applied to a particular node, but can be carried out by any node of the network.

When a communication is to be established between the first node and the second node, the first node receives from the second node, on step a), the identifier ID2 of the second node.

In order to discover the shared key for communicating with the second node, the first node needs to determine, in step b), the common element of the respective lists of the cryptographic elements of the two nodes N1 and N2 involved in the communication. Then, in step c), the node N1 generates a key with this determined common element, for instance by computing it with help of the identifier of N2 if the encryption element is a monovariant function as explained above.

Indeed, in accordance with 2-resilient key distribution schemes that can be used in this kind of networks and as introduced previously, nodes do not share ready-made keys. Instead, nodes are provided with some node-specific information that allows them to compute a shared key with any other node on input of that node's identifier. This node-specific information is derived from a keying root (KR) and the node-specific share for node i is denoted by $KR^{(i)}$. Hence, the different shares $KR^{(i)}$ are all different but correlated. This approach is especially interesting for mobile wireless sensor and actuator networks due to different reasons including: (i) the resource-constrained nature of wireless nodes; (ii) the mobility of nodes; (iii) or the low delay requirements of application scenarios such as patient monitoring or wireless control networks addressed by the ZigBee Alliance.

The method of this embodiment of the invention can be applied to combinatorial key pre-distribution methods. These form the basis of deterministic pairwise key pre-distribution scheme (DPKPS), which works as follows. In DPKPS not one but multiple keying roots are generated. A combinatorial concept is used to pre-distribute certain sets of keying root shares to the nodes in a clever way. This combinatorial concept can be a Finite Projective Plane (FPP) of order n (with n prime) and parameters $(n^2+n+1, n+1, 1)$, which is defined as an arrangement of $n^2+n+1$ distinct elements into $n^2+n+1$ blocks such that:

Each block contains exactly n+1 elements;
Every element occurs in exactly n+1 blocks;
Every pair of blocks has exactly 1 element in common.

The set of elements is denoted by $E=\{0, \ldots, n^2+n\}$ and the set of blocks by $B=\{B_0, \ldots, B_{n^2+n}\}$, where block $B_i=\{b_{i,0}, \ldots, b_{i,n}\} \subset E$.

The elements of the FPP correspond to different keying roots $KR_0, \ldots, KR_{n^2+n}$ in the system. In the pre-deployment phase before the operational phase, the sensor nodes are assigned to a particular FPP block according to the clever distribution. Here node i (with $i \in \{0, 1, 2, \ldots\}$) is assigned to block $B_j$ with:

$$j \equiv i \pmod{n^2+n+1}.$$

The keying material that a node is provided with consists of the shares derived from the roots in its particular block. Hence, node i gets keying material $KM^{(i)}$:

$$KM^{(i)}=\{KR_{b_{j,0}}^{(i)}, KR_{b_{j,1}}^{(i)}, \ldots, KR_{b_{j,n}}^{(i)}\}$$

Note that by the definition of the FPP, all the nodes then have one common root if they are in different blocks, or n+1 common roots if they are in the same block. After the nodes are deployed, a node $i_1$ that wants to establish a shared key with node $i_2$ performs the following key establishment procedure:

1. Determine the block identifier $j_2 \equiv i_2 \pmod{n^2+n+1}$.
2. Common root discovery:

a Generate the FPP block with block identifier $j_2$: $B_{j_2} = \{b_{j_2,0}, \ldots, b_{j_2,n}\}$.
b Compare the elements of block $B_{j_2}$ with the elements of its own block $B_{j_1}$ (which may be stored to save on computational effort) to discover the common element b.
c Retrieve the keying root share $KR_b^{(i_1)}$ from the keying material.

3. Compute the key from the share $KR_b^{(i_1)}$ and identifier $i_2$. This can be done with several methods. For example, the $KR_b^{(i_1)}$ being a monovariant polynomial can be computed with the value $i_2$ as variable. In some other example, this share is segmented in sub polynomials, computed each at $i_2$, and then concatenated or combined for instance with an XOR operand. By definition of the $\lambda$-resilient scheme, this key is equal to the key that node $i_2$ computes from its share $KR_b^{(i_2)}$ and identifier $i_1$.

The following table represents an FPP of order n=2 with parameters (7,3,1). The first column represents block $B_0$, corresponding to roots $\{KR_0, KR_2, KR_4\}$, the second column represents block $B_1$, corresponding to roots $\{KR_1, KR_3, KR_4\}$, etc. According to the clever distribution, node i (with $i \in \{0, 1, 2, \ldots\}$) is assigned to block $B_j$ with:

$j \equiv i \pmod{n^2+n+1}$.

| $B_0$ | $B_1$ | $B_2$ | $B_3$ | $B_4$ | $B_5$ | $B_6$ |
|---|---|---|---|---|---|---|
| 0 | 1 | 0 | 1 | 0 | 2 | 4 |
| 2 | 3 | 3 | 2 | 1 | 3 | 5 |
| 4 | 4 | 5 | 5 | 6 | 6 | 6 |

For instance, node 8 is assigned to block $B_1$ and therefore its Keying Material, denoted $KM^{(8)}$, is given by the set of shares:

$KM^{(8)} = \{KR_{b_{1,0}}^{(8)}, KR_{b_{1,1}}^{(8)}, KR_{b_{1,2}}^{(8)}\} = \{KR_1^{(8)}, KR_3^{(8)}, KR_4^{(8)}\}$.

If node 8 wants establish a key with node 14, it follows the key establishment procedure:
1. Determine the block identifier $j \equiv 14 \pmod{n^2+n+1}$, so j=0.
2. Common root discovery:
a Generate the FPP block $B_0 = \{1, 3, 4\}$.
b Compare to the own (stored) FPP block $B_0 = \{0, 2, 4\}$ to find the common element b=4.
c Retrieve the share $KR_4^{(8)}$ from the Keying Material $KM^{(8)}$.
3. Compute the key from the share $KR_4^{(8)}$ and identifier 14.

One of the main issues with this scheme for instance in combinatorial key pre-distribution methods is step 2 in the key establishment procedure: the discovery of a shared element in two FPP blocks. Because of the limited resources, this discovery should be done as efficiently as possible, i.e., requiring a minimum amount of computational effort, memory, and code size.

State-of-the-art methods proceed as described above, i.e., by generating the elements of the FPP block, comparing it to its own FPP block to find a common element, and retrieving the corresponding share from the keying material. An alternative could be for nodes to send in addition to the node identifier also the elements of their FPP block, although this results in a high communication overhead and authentication problems.

The essential idea of this invention is based on the insight that the value of the shared FPP element is irrelevant—only its position in the respective FPP blocks is needed. So instead of computing the whole FPP block and comparing it to its own (stored) block, a node may directly compute from the block identifiers the position of the shared element in the blocks, and hence the position of the shared keying root in its keying material.

In the following, it will be described one of the possible methods for generating the FPP such that the position of the common element of each set of cryptographic elements is linked to the identifiers of the nodes. This method is designed such as to establish algebraic relations between the positions of the shared element in the blocks and the respective block identifiers. Then, in the operational phase, these relations are used to define a method to directly derive the positions from the block identifiers.

The computational effort and code size required by this method is comparable to the generation of a normal FPP block. Hence, compared to the current method, this method saves on the computational effort and code size needed for comparing the blocks and selecting the common element. Moreover, this method has no additional memory requirements. This is in contrast to the previously described method, where nodes permanently store the elements of their own FPP block and temporarily store those of other nodes.

For generating an FPP with parameters $(n^2+n+1, n+1, 1)$ for n prime, it was proposed to use a set of mutually orthogonal latin squares (MOLS) that aid in defining which elements are to be included in which block. This procedure has been adapted to define a more convenient indexing and arrangement of blocks, and specify concrete formulas for the generation of these blocks. As a consequence, it establishes well-defined relations between pairs of block identifiers and the position of their shared element in these blocks. These previously lacking relations are then used to specify a method for determining these positions directly, without the need for generating and comparing the FPP blocks.

For the generation of the FPPs, in the deployment phase, for n prime, it is defined the n×n matrix M:

$$M = \begin{pmatrix} 0 & \ldots & n-1 \\ n & \ldots & 2n-1 \\ \vdots & \ddots & \vdots \\ n^2-n & \ldots & n^2-1 \end{pmatrix}$$

The rows and columns of M are indexed from 0 to n−1, so the elements of M are determined by $M_{i,j} = i \cdot n + j$ for $0 \leq i, j \leq n-1$.

Define the n×n matrices $L^{(a)}$ for 0 a n−1, also indexed from 0 to n−1, by:

$L^{(a)}_{k,l} = (a \cdot k + l)_{mod\ n}$ for $0 \leq k, l \leq n-1$.

An applicative example, for n=3, we have the matrices:

$$M = \begin{pmatrix} 0 & 1 & 2 \\ 3 & 4 & 5 \\ 6 & 7 & 8 \end{pmatrix},$$

$$L^{(0)} = \begin{pmatrix} 0 & 1 & 2 \\ 0 & 1 & 2 \\ 0 & 1 & 2 \end{pmatrix},$$

$$L^{(1)} = \begin{pmatrix} 0 & 1 & 2 \\ 1 & 2 & 0 \\ 2 & 0 & 1 \end{pmatrix},$$

$$L^{(2)} = \begin{pmatrix} 0 & 1 & 2 \\ 2 & 0 & 1 \\ 1 & 2 & 0 \end{pmatrix}$$

The construction of the FPP blocks $B_0, \ldots, B_{n^2+n}$, where $B_j = \{b_{j,0}, \ldots, b_{j,n}\} \subset \{0, \ldots n^2+n\}$, is defined as follows.

For $0 \leq j \leq n^2 - 1$ and $0 \leq k \leq n-1$, the elements $b_{j,k}$ adopt a value from matrix M. Namely, the index k indicates the row number of M, while the value $L^{(a)}_{k,l}$ indicates the column number, where $l \equiv j \pmod{n}$ and $a = \lfloor j/n \rfloor$, where $\lfloor \; \rfloor$ is the floor operator, which for $n \leq x < n+1$, it returns n. Hence, For $0 \leq j \leq n^2-1$ and $0 \leq k \leq n-1$:

$$b_{j,k} = M_{k,L^{(a)}_{k,l}} = k \cdot n + (k \cdot \lfloor j/n \rfloor + j)_{(\bmod n)}$$

For $n^2 \leq j \leq n^2+n-1$ and $0 \leq k \leq n-1$, the elements $b_{j,0}, \ldots, b_{j,n-1}$ are formed by the rows of M, so:

$$b_{j,k} = M_{j,k} = (j-n^2)n + k$$

For $0 \leq n^2 \leq n$ and $k=n$, the element $b_{j,k}$ is defined by:

$$b_{j,k} = n^2 + \lfloor j/n \rfloor$$

For $j = n^2 + n$ and $0 \leq k \leq n$, the element $b_{j,k}$ is defined by:

$$b_{j,k} = n^2 + k$$

This construction can be described by the following formulas:

$$b_{j,k} = \begin{cases} kn + (k\lfloor j/n \rfloor + j)_{(\bmod n)} & \text{for } 0 \leq k \leq n-1 \text{ and } 0 \leq j \leq n^2-1 \\ n(j-n^2)+k & \text{for } 0 \leq k \leq n-1 \text{ and } n^2 \leq j \leq n^2+n \\ n^2 + \lfloor j/n \rfloor & \text{for } k=n \text{ and } 0 \leq j \leq n^2+n-1 \\ n^2 + n & \text{for } k=n \text{ and } j = n^2+n \end{cases}$$

Note that because of the direct computation of the positions, this FPP construction does not have to be performed by the nodes. Instead, these relations can be used to directly compute the position of a common element from the FPP block identifiers. Only the party that pre-distributes the keying material to the nodes has to compute the complete FPP.

For n=3, the construction leads to the FPP depicted in the following table:

| | | j | | | | | | | | | | | |
|---|---|---|---|---|---|---|---|---|---|---|---|---|---|
| | | 0 | 1 | 2 | 3 | 4 | 5 | 6 | 7 | 8 | 9 | 10 | 11 | 12 |
| k | 0 | 0 | 1 | 2 | 0 | 1 | 2 | 0 | 1 | 2 | 0 | 3 | 6 | 9 |
| | 1 | 3 | 4 | 5 | 4 | 5 | 3 | 5 | 3 | 4 | 1 | 4 | 7 | 10 |
| | 2 | 6 | 7 | 8 | 8 | 6 | 7 | 7 | 8 | 6 | 2 | 5 | 8 | 11 |
| | 3 | 9 | 9 | 9 | 10 | 10 | 10 | 11 | 11 | 11 | 12 | 12 | 12 | 12 |

To illustrate the way the elements are selected for $0 \leq j \leq n^2-1$ and $0 \leq k \leq n-1$, consider for example the column j=5. For $0 \leq k \leq n-1$, the elements $b_{j,k}$ take on the value in M with row number k and the column number equal to value $L^{(a)}_{k,l}$. Since here $a = \lfloor j/n \rfloor = 1$ and $l \equiv j \pmod{n} = 2$, the column numbers for M are given by column 2 in the matrix $L^{(1)}$, so 2, 0, and 1. Hence, the values $b_{5,0}$, $b_{5,1}$, and $b_{5,2}$, are taken from the M's columns 2, 0, and 1, respectively. So $\{b_{5,0}, b_{5,1}, b_{5,2}\} = \{2,3,7\}$, as can be seen in the following:

$$L^{(1)} = \begin{pmatrix} 0 & 1 & \boxed{2}^{l=2} \\ 1 & 2 & \boxed{0} \\ 2 & 0 & \boxed{1} \end{pmatrix}$$

$$M = \begin{pmatrix} 0 & 1 & \boxed{2} \\ \boxed{3} & 4 & 5 \\ 6 & \boxed{7} & 8 \end{pmatrix}$$

A node with identifier $i_1$ computes once and stores the block identifier $j_1 = i_1 \bmod (n^2+n+1)$ and auxiliary parameter $a_1 = \lfloor j_1/n \rfloor$. Note that unlike before, there is no need for node $i_1$ to compute and store the whole FPP block. To establish a shared key with another node, $i_2$, the node computes $j_2 = i_2 \bmod(n^2+n+1)$ and $a_2 = \lfloor 1_2 \; n \rfloor$. To determine the positions $k_1$ and $k_2$ in the keying material of the nodes $i_1$ and $i_2$, respectively, we can distinguish the following five cases (without loss of generality we assume that $j_1 \leq j_2$).

1 $j_1 = j_2$. In this case the two nodes share the same FPP block and any element in the block can be picked. Picking always the same element (e.g., the first one) would decrease the security. Therefore the selected element should depend on the node identifiers, be uniformly distributed over the n+1 elements, and be straightforwardly computable for both nodes. This is achieved by setting:

$$k_1 = k_2 = \frac{|i_1 - i_2|}{n^2 + n + 1} \pmod{n+1}.$$

Note that by definition $j_1 = j_2$ implies that $|i_1 - i_2|$ is divisible by $n^2+n+1$, so this division is a cheap operation as it requires no modular arithmetic.

2 $j_1 \neq j_2$ and $a_1 = a_2$. In this case, $a_1$ and $a_2$ cannot be equal to n, for otherwise $j_1$ would equal $j_2$. Hence, $0 \leq j_1, j_2 \leq n^2+n-1$ and consequently:

$$b_{j_1,n} = n^2 + \lfloor j_1/n \rfloor = n^2 + a_1 = n^2 + a_2 = n^2 + \lfloor j_2/n \rfloor = b_{j_2,n}.$$

So the common element is at position n in both blocks, so $k_1 = k_2 = n$.

3 $a_1 < a_2 = n+1$. Then $j_2 = n^2 \; n$, and it is easily verified that for all $k_2$ we can write $b_{j_2,k_2} = n^2 + k_2$. Moreover, for $k_2 = a_1$ it holds that:

$$b_{j_1,n} = n^2 + \lfloor j_1/n \rfloor = n^2 + a_1 = n^2 + k_2 = b_{j_2,k_2}.$$

Hence, the common element is located at position $k_1 = n$ in block $B_{j_1}$ and position $k_2 = a_1$ in block $B_{j_2}$.

4 $a_1 < a_2 = n$. In this case, $0 \leq j_1 \leq n^2-1$ and $n^2 \leq j_2 \leq n^2+n-1$. Note that by construction $j_2 - n^2$ indicates the row of M that defines the first n elements of block $B_{j_2}$, namely $b_{j_2,0}, \ldots, b_{j_2,n-1}$. Since for $0 \leq j_1 \leq n^2-1$ the first element of block $B_{j_1}$ comes from the first row of M, the second element from the second row and so on, we find that $k_1 = j_2 - n^2$. Furthermore, the column number in M of that particular element, given by $L^{(a_1)}_{k_1,1} = (a_1 \cdot k_1 + 1)_{\bmod n} = (a_1 \cdot j_2 + j_1)_{\bmod n}$, indicates the position $k_2$ of that element in $B_{j_2}$. Indeed, for $k_1 = j_2 - n^2$ and $k_2 = (j_1 + a_1 j_2)_{\bmod n}$ we find:

$$b_{j_1,k_1} = k_1 n + (k_1 \lfloor j_1/n \rfloor + j_1)_{mod\ n}$$
$$= n(j_2 - n^2) + (j_2 \lfloor j_1/n \rfloor + j_1)_{mod\ n}$$
$$= n(j_2 - n^2) + (j_2 a_1 + j_1)_{mod\ n}$$
$$= n(j_2 - n^2) + k_2$$
$$= b_{j_2,k_2}.$$

5 $a_1 < a_2 < n$. For $k_1 = k_2 = ((j_2-j_1)/(a_1-a_2))_{mod\ n}$, we have $a_1 k_1 + j_1 = a_2 k_2 + j_2$ (mod n).
Then:
$b_{j_1,k_1} = k_1 n + (k_1 a_1 + j_1)_{mod\ n} = k_2 n + (k_2 a_2 + j_2)_{mod\ n} = b_{j_2,k_2}$.
Hence in this case, the positions are given by:

$$k_1 = k_2 = \left(\frac{j_2 - j_1}{a_1 - a_2}\right)_{mod\ n}.$$

This is the only case where a relatively expensive modular division is needed to compute the positions. This computation can be performed by trying k=0, 1, 2, . . . for the equality $$(a_1-a_2)k = j_2 - j_1 \ (mod\ n).$$

The above can be summarized in the following algorithm for the detection of the position of the common element in the FPP blocks for a node $i_1$ with another node $i_2$. Here we assume that node $i_1$ has already computed and stored block identifier $j_1 = i_1\ mod(n^2+n+1)$ and auxiliary variable $a_1 = \lfloor j_1/n \rfloor$.
Compute $j_2 = i_2\ mod(n^2+n+1)$ and $a_2 = \lfloor j_2/n \rfloor$.
Set A=argmin($j_1,j_2$) and B=argmax($j_1,j_2$).
If $j_A = j_B$ then $$k_A = k_B = \frac{|i_A - i_B|}{n^2 + n + 1} \ (mod\ n + 1).$$

Else if $a_A = a_B$ then $k_A = k_B = n$.
Else if $a_B = n+1$ then $k_A = n$ and $k_B = a_A$.
Else if $a_B = n$ then $k_A = j_B - n^2$ and $k_B = j_A + a_A \cdot j_B$ (mod n).
Else $$k_A = k_B = \frac{j_B - j_A}{a_A - a_B} \ (mod\ n).$$

This embodiment of the invention finds application in ZigBee networks as a key feature that improves the performance of λ-secure key distribution schemes used to bootstrap security in resource-constrained wireless nodes for patient monitoring and distributed wireless control networks. Additionally, this embodiment can also be applied to improve the performance of those systems that require the computation of combinatorial distributions based on finite projective planes (FPPs).

Other algorithms or definitions of the FPPs could be used as soon as there exists a relationship between the position in the list of the elements common to a pair of nodes and their identifiers.

WSNs have a huge number of potential applications including environmental monitoring (e.g. glaciers, fires), metering, commercial building automation or patient monitoring. In order to provide a common and interoperable protocol for these WSNs applications, the ZigBee Alliance is developing a new low data rate, long battery life, and secure protocol for WSN nodes.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method of operating a first node for communicating in a network with a second node, the method comprising the acts of:
in a first node:
a receiver configured to receive from a second node, a second node identifier,
a controller configured to:
determine from the second node identifier, a position of a cryptographic element in a first logical list of cryptographic elements associated with the first node, wherein the position identifies a cryptographic element having a common root with a cryptographic element among a plurality of cryptographic elements of a second logical list associated with the second node, the determination comprising:
computing a second node block identifier as:

$j_2 = i_2 mod(n^2+n+1)$, where $j_2$ is the block identifier of the second node,
$i_2$ the second node identifier, and
n is the order of a Finite Projective Plane;
computing a first block identifier of the first node as:

$j_1 = i_1 mod(n^2+n+1)$, where $j_1$ is the block identifier, and
$i_1$ the first node identifier,
wherein if the second node block identifier equals the first block identifier, the position of the cryptographic element in the first logical list is dependent on:

$$k_1 = \frac{|i_1 - i_2|}{n^2 + n + 1} \ (mod\ n + 1),$$

and
if the second node block identifier does not equal the first block identifier, the position of the cryptographic element in the first logical list is dependent on:

$$k = \frac{|j_2 - j_1|}{|a_2 - a_1|} \ (mod\ n),$$

where $a_2$ equals floor($j_2/n$) and $a_1$ equals floor ($j_1/n$), and
generating an encryption key by means of the cryptographic element having the common root and the second node identifier.

2. The method of claim 1, wherein the cryptographic elements are keying materials for generating a shared key between the first and second node.

3. The method of claim 1, further comprising:
prior to the receiving act,
assigning to the nodes of the network, a logical list of cryptographic elements, the logical list being selected depending on an identifier of the corresponding node among a plurality of available logical lists of cryptographic elements.

4. The method of claim 3, wherein the logical lists of cryptographic elements are generated so that any pair of logical lists comprise each at least one cryptographic element having a common root.

5. The method of claim 3, wherein the logical lists of cryptographic elements are generated so that a position of a common element in two different logical lists can be discovered without generating the whole composition of the logical list of cryptographic elements.

6. The method of claim 3, wherein there is a relationship between each considered pair of logical lists and the position in each logical list of the pair of the at least one keying material having a common root.

7. A communication node adapted for communicating in a network with a second communication node, wherein the communication node comprises:
a communication node identifier,
a first logical list of cryptographic elements including a plurality of cryptographic elements;
a receiver configured to:
  receive a second identifier from the second communication node, and
a controller configured to:
  determine from the second identifier, a position of at least one cryptographic element in the first logical list of cryptographic elements, wherein the position identifies a cryptographic element having a common root with a cryptographic element of a second logical list of cryptographic elements associated with the second communication node,
the determination comprising:
computing a second node block identifier as:

$j_2 = i_2 \bmod(n^2+n+1)$, where $j_2$ is the block identifier of the second node,
$i_2$ the second node identifier, and
n is the order of a Finite Projective Plane;
computing a first block identifier of the first node as:

$j_1 = i_1 \bmod(n^2+n+1)$, where $j_1$ is the block identifier, and
$i_1$ the first node identifier,
wherein if the second node block identifier equals the first block identifier, the position of the cryptographic element in the first logical list is dependent on:

$$k_1 = \frac{|i_1 - i_2|}{n^2 + n + 1} \pmod{n+1},$$

and
if the second node block identifier does not equal the first block identifier, the position of the cryptographic element in the first logical list is dependent on:

$$k = \frac{|j_2 - j_1|}{|a_2 - a_1|} \pmod{n},$$

where $a_2$ equals floor($j_2/n$) and $a_1$ equals floor ($j_1/n$), and
generate an encryption key by means of the cryptographic element having a common root and the second node identifier.

8. A communication system comprising:
a first node; and
a second node adapted for communicating in a network;
the first node comprising:
  a first controller,
  a receiver controlled by the first controller,
  a first node identifier, and
  a first logical list of cryptographic elements comprising a first plurality of cryptographic elements;
the second node comprising:
  a second controller,
  a transmitter controlled by the second controller,
  a second node identifier, and
  a second logical list of cryptographic elements comprising a second plurality of cryptographic elements,
wherein the second controller is configured to:
  control the transmitter of the second node to transmit to the first node a second node identifier; and
the first controller of the first node is configured to:
  control the receiver to receive from the second node the second node identifier,
determine from the second node identifier a position in the first logical list having a common root with a cryptographic element of the second logical list, the determination comprising:
computing a second node block identifier as:

$j_2 = i_2 \bmod(n^2+n+1)$, where $j_2$ is the block identifier of the second node,
$i_2$ the second node identifier, and
n is the order of a Finite Projective Plane;
computing a first block identifier of the first node as:

$j_1 = i_{1\ 1\ mod}(n^2+n+1)$, where $j_1$ is the block identifier, and
$i_1$ the first node identifier,
wherein if the second node block identifier equals the first block identifier, the position of the cryptographic element in the first logical list is dependent on:

$$k_1 = \frac{|i_1 - i_2|}{n^2 + n + 1} \pmod{n+1},$$

and
if the second node block identifier does not equal the first block identifier, the position of the cryptographic element in the first logical list is dependent on:

$$k = \frac{|j_2 - j_1|}{|a_2 - a_1|} \pmod{n},$$

where $a_2$ equals floor($j_2/n$) and $a_1$ equals floor ($j_1/n$), and
generate an encryption key by means of the cryptographic elements having the common root and the second node identifier.

9. A tangible, non-transitory, computer-readable, storage medium comprising any storage medium that is not a transitory propagating signal or wave, having stored thereon instructions, which when accessed by the processing circuitry configures the processing circuitry to:

in a first node:

receive, in a receiver, a second node identifier from a second node, determine, by a controller, from the second node identifier, a position of at least one cryptographic element in a first logical list of cryptographic elements associated with the first node, the position identifying a cryptographic element having a common root with a cryptographic element of a second logical list of cryptographic elements associated with the second node, the determination comprising:

computing a second node block identifier as:

$j_2 = i_2 \mod(n^2+n+1)$, where $j_2$ is the block identifier of the second node,
$i_2$ the second node identifier, and
n is the order of a Finite Projective Plane;

computing a first block identifier of the first node as:

$j_1 = i_1 \mod(n^2+n+1)$, where $j_1$ is the block identifier, and
$i_1$ the first node identifier, wherein if the second node block identifier equals the first block identifier, the position of the cryptographic element in the first logical list is dependent on:

$$k_1 = \frac{|i_1 - i_2|}{n^2 + n + 1} \pmod{n+1},$$

and if the second node block identifier does not equal the first block identifier, the position of the cryptographic element in the first logical list is dependent on:

$$k = \frac{|j_2 - j_1|}{|a_2 - a_1|} \pmod{n},$$

where $a_2$ equals floor($j_2/n$) and $a_1$ equals floor ($j_1/n$), and generate an encryption key by means of the cryptographic element having a common root and the second node identifier.

10. The communications node of claim 7, wherein the cryptographic elements are keying materials for generating a shared key between the first and second node.

11. The communications node of claim 7, the processing circuitry configured to:

prior to the receiving the second node identifier, assign to nodes of the network, a logical list of cryptographic elements, the logical list being selected depending on an identifier of a corresponding node among a plurality of available logical lists of cryptographic elements.

12. The communications node of claim 11, wherein the logical lists of cryptographic elements are generated so that any pair of logical lists comprise at least one cryptographic element having a common root.

13. The communications node of claim 11, wherein the logical lists of cryptographic elements are generated so that a position of a common element in two different logical lists can be discovered without generating the whole composition of the logical list of cryptographic elements.

14. The communications node of claim 11, wherein there is a relationship between each considered pair of logical lists and the position in each logical lists of the pair of the at least one keying material having a common root.

15. A method of operating a first node for communicating in a network with a second node, the method comprising the acts of:

in a first node:

receiving from a second node a second node identifier, determining by a controller, from the second node identifier, a position of a cryptographic element in a first logical list of cryptographic elements representative of a common element between the first node and the second node, the determination comprising:

computing a second node block identifier as:

$j_2 = i_2 \mod(n^2+n+1)$, where $j_2$ is the block identifier of the second node,
$i_2$ the second node identifier, and
n is the order of a Finite Projective Plane;

computing a first block identifier of the first node as:

$j_1 = i_1 \mod(n^2+n+1)$, where $j_1$ is the block identifier, and
$i_1$ the first node identifier, wherein if the second node block identifier equals the first block identifier, the of the cryptographic element position in the first logical list is dependent on:

$$k_1 = \frac{|i_1 - i_2|}{n^2 + n + 1} \pmod{n+1},$$

and if the second node block identifier does not equal the first block identifier, the position of the cryptographic element in the first logical list is dependent on:

$$k = \frac{|j_2 - j_1|}{|a_2 - a_1|} \pmod{n},$$

where $a_2$ equals floor($j_2/n$) and $a_1$ equals floor ($j_1/n$), and generate an encryption key by means of the cryptographic element having a common root and the second node identifier.

* * * * *